(12) United States Patent
Burgos Gallego et al.

(10) Patent No.: US 8,165,703 B2
(45) Date of Patent: Apr. 24, 2012

(54) COMPUTER ASSISTED METHOD FOR THE ADVANCED DESIGN OF BENT PARTS OF COMPOSITE MATERIAL

(75) Inventors: Raúl Burgos Gallego, Madrid (ES); Antonio De Julián Aguado, Madrid (ES)

(73) Assignee: Airbus Operations S.L., Madrid (ES)

( * ) Notice: Subject to any disclaimer, the term of this patent is extended or adjusted under 35 U.S.C. 154(b) by 432 days.

(21) Appl. No.: 12/254,021

(22) Filed: Oct. 20, 2008

(65) Prior Publication Data

US 2010/0042243 A1 Feb. 18, 2010

(30) Foreign Application Priority Data

Aug. 18, 2008 (ES) .................................. 200802450

(51) Int. Cl.
*G06F 19/00* (2011.01)
(52) U.S. Cl. ............................................. 700/98; 703/2
(58) Field of Classification Search .................... 700/98, 700/181, 182, 255, 119, 120; 703/1, 2; 345/323, 345/421, 646, 427; 382/128
See application file for complete search history.

(56) References Cited

U.S. PATENT DOCUMENTS

| 5,179,644 | A  | * | 1/1993  | Chiyokura et al. | ............ | 345/441 |
| 6,395,992 | B1 | * | 5/2002  | Nakayama et al.  | ............ | 174/254 |
| 6,819,966 | B1 | * | 11/2004 | Haeberli          | ........................ | 700/98  |
| 2002/0183986 | A1 | * | 12/2002 | Stewart et al. | ..................... | 703/2   |
| 2003/0080957 | A1 | * | 5/2003  | Stewart et al. | ................. | 345/420 |
| 2003/0103048 | A1 | * | 6/2003  | Kindratenko et al. | ........ | 345/420 |
| 2003/0191554 | A1 | * | 10/2003 | Russell et al. | ................. | 700/187 |
| 2006/0265198 | A1 |   | 11/2006 | Kanai et al. |  |  |

FOREIGN PATENT DOCUMENTS

EP  1 750 228 A2  2/2007

OTHER PUBLICATIONS

Kai et al, CAD/CAM/CAE for ring design and manufacture, Nanyang Technological Institue, Feb. 1991, p. 13-24.*
International-type Search Report and Written Opinion dated Jan. 25, 2010 in respect of Application No. PCT/ES2009/070344.
Kai, Chua Chee, et al., "CAD/CAM/CAE for ring design and manufacture", Computer-Aided Engineering Journal, Feb. 1991, pp. 13-24.
Mangalgiri, P.D., "Composite materials for aerospace applications", Bull. Mater. Sci., vol. 22, No. 3, May 1999, pp. 657-664.

* cited by examiner

*Primary Examiner* — Kidest Bahta
(74) *Attorney, Agent, or Firm* — Ladas & Parry LLP

(57) ABSTRACT

Computer assisted method for the advanced design of bent parts of composite material using a computer assisted CAD system comprising the following stages: a) Supplying the 2D mesh model (11) of the part; b) Generating the 3D outer surface (19) of the part; c) Obtaining the 3D mesh model (51) by adapting the 2D mesh model (11) to the geometry of the 3D outer surface (19) by bending the contour lines (17) of the patterns (13) of the 2D model (11) with respect to some bending lines (23) set up in relation to a bending surface (31) similar to that of the tool provided for bending the part; d) Generating the solid model (53) of the bent part. The invention also relates to a computer program that when it is executed on a computer together with a CAD system it causes the execution of the method.

7 Claims, 3 Drawing Sheets

COMPUTER ASSISTED METHOD FOR THE ADVANCED DESIGN OF BENT PARTS OF COMPOSITE MATERIAL

FIELD OF THE INVENTION

The present invention relates to a computer assisted method for the advanced design of bent parts of composite material and more particularly to a method that can be used to obtain the solid model of the bent part from the 2D mesh model using a CAD system.

BACKGROUND OF THE INVENTION

In some fields of engineering there is a strong trend towards increasing the amount of parts made of composite materials, e.g. in the aeronautical field: wing skins, cover plates and sections of fuselage are parts that can be manufactured using composite materials.

The manufacturing processes for these parts basically comprise a stage of tape-laying, in which layers of a composite material such as prepreg, which is a mixture of fibre reinforcement and polymer matrix capable of storage, are placed in a suitably shaped mould/tool, and a stage of forming and curing.

The composite material may take various forms and in particular the form of a mesh. The composite material meshes are not placed randomly but are arranged in each area in a number and with an alignment of their fibre reinforcement, typically carbon fibre, determined according to the nature and magnitude of the forces that the part is going to withstand in each area. The difference in thickness between the different areas causes mesh fall-offs, which needs to be set up and represented in a mesh model.

The design of such parts is carried out by means of a complex process including stages of calculation, mesh model design and analysis of their producibility, with feedback loops when changes are made in any of these stages.

Specialist engineers in computing use computer programs to calculate the behaviour of the part under given loads, and design engineers use CAD systems for generating the mesh model, i.e. to define the location and contour of the component meshes of the laminate, based on the specifications of the laminate supplied by the calculation results.

Even with CAD system functionalities, the process of generating the aforementioned mesh models in CAD systems is a tedious proceeding involving a great deal of repetitive manual work, with the consequent risk of mistakes, especially in the case of bent parts where, with current tools, the solid model of the part is obtained from a 2D mesh model—corresponding to the flat laminate which has to be made by a process of forming and curing to obtain the final part—by means of a process in which the reference lines have to be bent on the flange surfaces, and the areas or plateaux of different thickness, both in the core and in the flanges, having to be manually distributed taking into account all the joins between plateaux and the bending radii, this process being tedious, long and repetitive.

The impossibility of automatically or semi-automatically obtaining the solid model of bent parts of composite materials with the currently available CAD systems from the 2D mesh model of the flat laminate which is obtained in the first stage of manufacture of the said parts, is a drawback that hinders the design processes for such parts.

The present invention is aimed at solving this drawback.

SUMMARY OF THE INVENTION

One object of the present invention is to provide a method for obtaining the solid model of a bent part of composite material from the 2D mesh model.

Another object of the present invention is to provide a method for obtaining the solid model of a complex part resulting from the assembly of several simple parts from the 2D mesh models of the simple parts in order to check that the stacking rules are met in the assembled set.

Another object of the present invention is to complement the CAD systems used in the design of composite material parts with software for automatically or semi-automatically obtaining the solid model of a bent part of composite material from the 2D mesh model.

In a first aspect, these and other objects are achieved with a method of designing a bent part of composite material using a computer assisted CAD system comprising the following stages:

Supplying the 2D mesh model of the part.
Generating the 3D outer surface of the part.
Obtaining the 3D mesh model by adapting the 2D mesh model to the geometry of the 3D outer surface.
Generating the solid model of the bent part.

In a preferred embodiment, the method is applied to a simple part of an aeronautical structure such as a spar with a C-shaped cross-section.

In another preferred embodiment, the method is applied to a complex part resulting from the assembly of several simple parts.

In a second aspect, the aforementioned objects are achieved with software that when it is executed on a computer together with a CAD system or included in it, it enables the automatic or semi-automatic execution of the various stages of the aforementioned method.

Other characteristics and advantages of the present invention will become evident from the following detailed description of the embodiments, illustrative of their object, together with the accompanying figures.

DETAILED DESCRIPTION OF THE INVENTION

For a proper understanding of the present invention, the meaning of some of the terms used in this descriptive account are explained.

Bent part: Composite material part manufactured by means of a process comprising a first stage of tape-laying in which a (flat or curved) laminate is obtained and a second stage of forming and curing in which the said laminate is "bent" to obtain the desired shape. We may cite a C-shaped spar of a tailplane torsion box as an example of a bent part used in the aeronautics industry.

Mesh or Pattern: Laminar material used for the formation of the laminate defined by its contour and its position in the laminate, as well as by some physical characteristic such as the alignment of the fibre reinforcement.

2D mesh model: Two-dimensional representation in a CAD system of the meshes that must be stacked to form a flat laminate. One of the purposes of the 2D mesh model is that of providing the necessary information on each one of the meshes for the manufacture of the said flat laminate.

3D mesh model: Three-dimensional representation in a CAD system of the part's mesh model in its final state. One of the basic purposes of the 3D mesh model is that of optimizing the display of its final state.

Solid model: Representation of the bent part in a CAD system such as CATIA for example, showing both its geometry and relevant physical properties. One of the basic purposes of the 3D mesh model is that of supplying the information necessary for optimizing the design of the part.

We shall now describe a preferred embodiment of the method forming the subject of this invention in relation to a C-shaped bent part comprising the following stages, all performed in a CAD system:

a) Obtaining the 2D mesh model of the part.
b) Generating the 3D outer surface of the part.
c) Generating the 3D mesh model of the part.
d) Generating the solid model of the bent part.

We describe these stages in detail below.

a) Obtaining the 2D Mesh Model of the Part

The 2D mesh model is obtained in a known way using tools available in CAD systems based on the references provided by basic geometry and the finite element data given by calculation.

The basic geometry data refer to the support surface of the pattern geometry and structural elements involved in the design process (surfaces, planes and curves). The calculation data are assigned to the model and the patterns will be obtained as a result after the design process.

Figure 1:
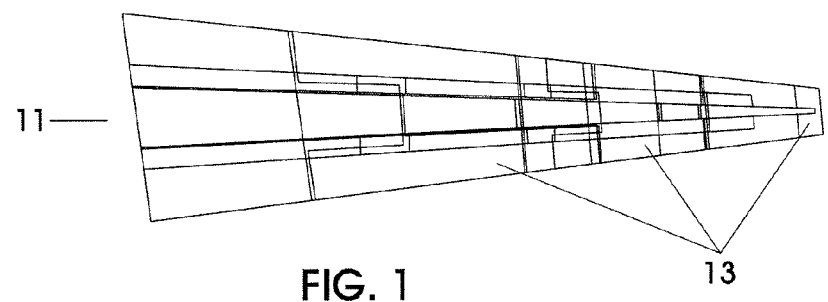
FIG. 1 shows a 2D mesh model of a flat laminate from which the bent part is formed.

FIG. 1 shows the 2D mesh model 11 obtained in this stage, which corresponds to a flat laminate since, in the case we are considering, the support surface of the pattern geometry is a flat entity because it is produced on a flat tool with an ATL tape-laying technique. As we have already said this flat laminate must be "bent" in order to obtain the final part in the forming and curing stage.

Thus the 2D mesh model 11 shows a set of flat patterns 13 some of which will have to be bent in the second stage of manufacture of the bent part.

Figure 2:
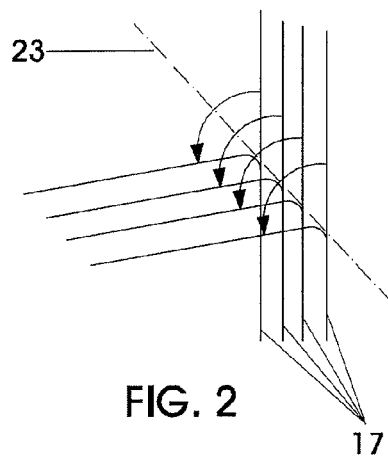
FIG. 2 schematically shows the bending of the pattern contour lines with respect to the bending line.

Once the 2D mesh model 11 has been defined, the pattern contour lines 17 that must be bent with respect to what we shall call the bending line 23, are identified, as shown schematically in FIG. 2.

b) Generating the 3D Outer Surface of the Part

The 3D outer surface of the part on which the 3D mesh model will be supported is constructed using the available geometric data for the purpose, taking into account the method of manufacture of the part.

Figure 3:
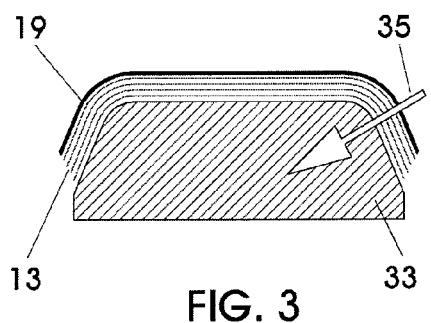
FIG. 3 schematically shows the process of forming the bent part on a male tool.

If a male tool 33 is used as depicted in FIG. 3 the patterns 13 will be bent over a geometrically convex surface. In this case, the bending radius of the surface to be created, i.e. the radius between core and flanges in the part, will depend on the initial radius used on the tool plus the total thickness by areas obtained in the laminate. This will lead to this surface having a variable radius throughout the areas of the laminate of different thickness. The dark strip 19 represents the surface to be modelled. The arrow 35 indicates where the thickness increases at the time of creating the inner surface of the solid.

Figure 4:
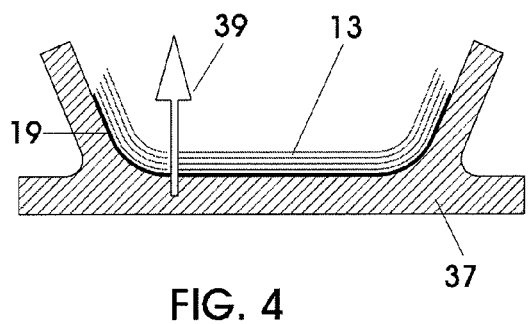
FIG. 4 schematically shows the process of forming the bent part on a female tool.

If a female tool 37 is used as depicted in FIG. 4 the patterns 13 will be bent on a geometrically concave surface. In this case, the bending radius of the surface to be created, i.e. the radius between core and flanges in the part, will be constant. The dark strip 19 represents the surface to be modelled. The arrow 37 indicates where the thickness increases at the time of creating the inner surface of the solid.

Between the lines to be bent there are areas where the thickness of the laminate may be different. In the case of working with a male tool it is necessary to determine the thickness for modelling the surface with the corresponding variation in radii. The calculated thickness will be added to the minimum radius determined by the tool.

c) Generating the 3D Mesh Model of the Part

Once the 3D surface 19 has been obtained, the contour lines previously identified by the corresponding bending line 23 are bent.

Figure 5:
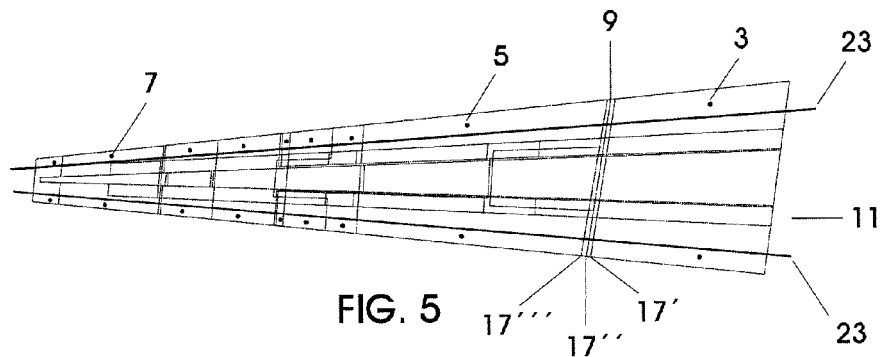
FIG. 5 schematically shows the areas of different thickness in the 2D mesh model and the bending lines with respect to which the pattern contour lines are bent.
Figure 6:
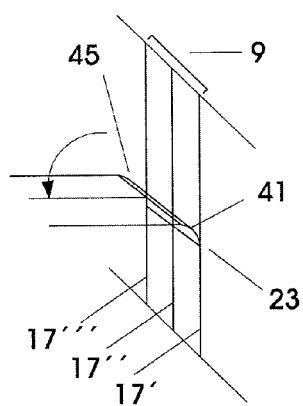
FIG. 6 schematically shows the bending of three contour lines located on a ramp between two areas of different thickness.
Figure 7:
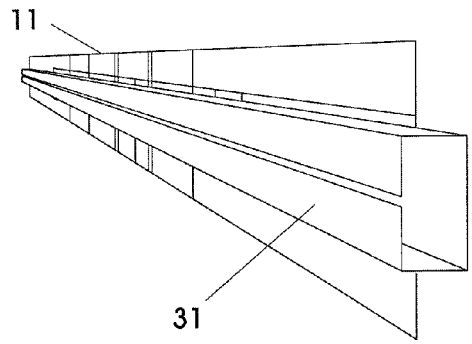
FIG. 7 shows the 2D mesh model next to the bending surface.

As shown in FIGS. 5, 6 and 7 the bending lines 23 are determined by the 2D mesh model 11 and a bending surface 31 similar in shape to that of the part forming tool. FIG. 5 shows areas 3, 5, ... 7 of different thickness and indicates, for better illustration, three contour lines 17', 17", 17''' which determine a ramp 9 between area 3 and area 5.

These contour lines 17', 17", 17''' must be bent as shown schematically in FIG. 6 and it may occur as we have previously indicated that the radii 41, 45 of lines 17' and 17''' are different.

The process of bending each contour line 17 comprises the following steps:

The intersection of the contour line 17 to be bent is created with the bending line 23 giving a point as a result.

A tangent to the bending line 23 is drawn through this point.

The contour line to be bent 17 is cut by the previously calculated intersection. The result of the cut will be the section of line to be rotated which will rest on the 3D surface 19.

A surface of revolution is created taking the tangent as the axis of rotation and the previously cut curve section to be bent as the shape.

The said surface of revolution intersects with the 3D surface 19. The result will be the bent contour line 17 resting on the 3D surface 19.

Finally, the mesh model contours are adapted to the bent geometry.

Figure 8:
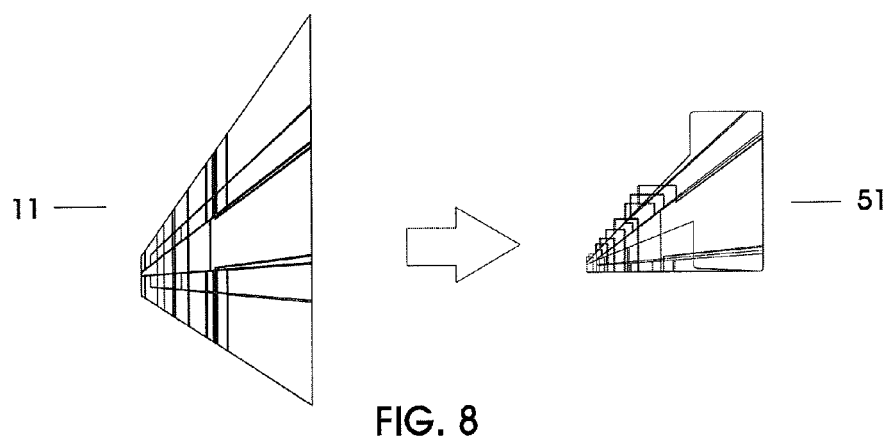
FIG. 8 depicts the transition from the 2D mesh model to the 3D mesh model.

The result of this stage, as illustrated in FIG. 8, is the 3D mesh model 51.

d) Generating the Solid Model of the Bent Part

Figure 9:
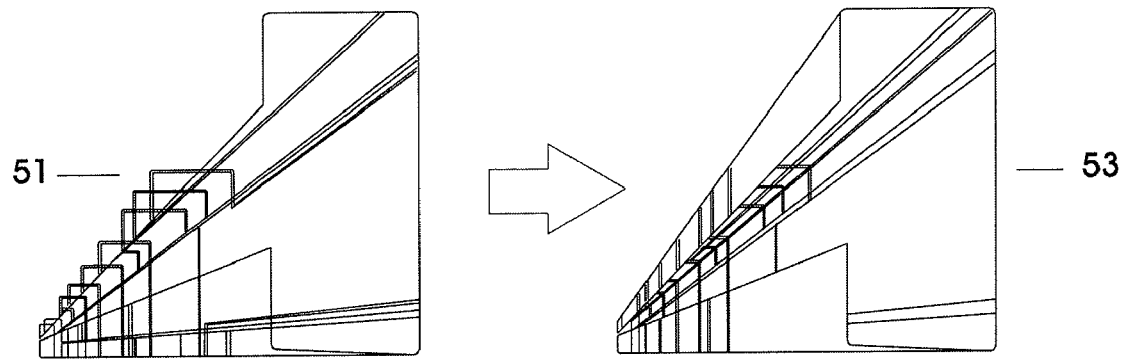
FIG. 9 depicts the transition from the 3D mesh model to the solid model.

Based on the 3D mesh model 51 and as illustrated in FIG. 9, the solid model 53 is obtained using known CAD tools.

In the preferred embodiment that we are describing, the method forming the subject of the present invention has been used for generating the model of a C-shaped simple part such as a spar of an aeronautical structure, but as the expert in the matter will well understand, the method is applicable to any flat-designed composite material part with flat tape-laying and subsequently bent at the forming stage to acquire the desired final shape.

Figure 10:
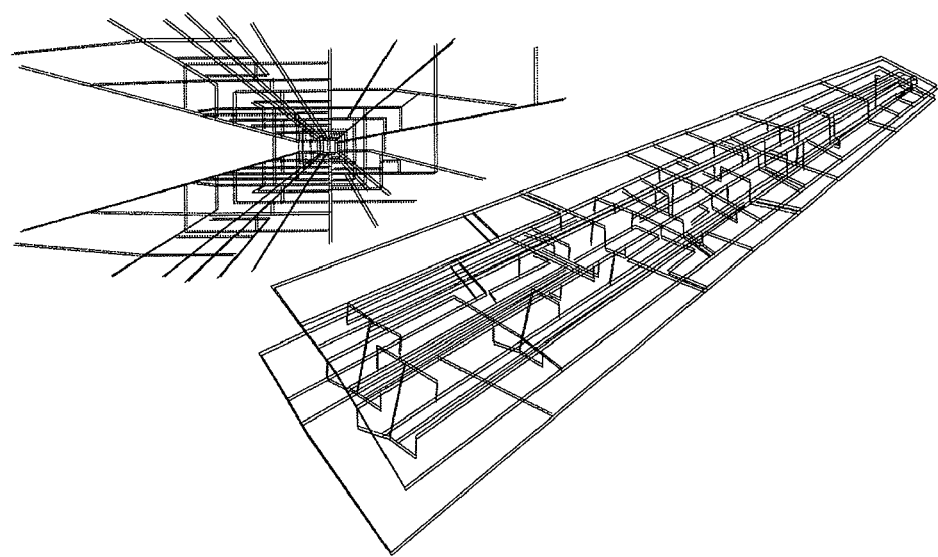
FIG. 10 shows a complex part resulting from the assembly of several simple parts, to which the method forming the subject of the present invention can be applied.

The method is also applicable to a complex part such as that shown in FIG. 10 resulting from the assembly of four C-shaped parts and two flat parts. In this case steps a), b) and c) are applied to each simple part, in a step e) the 3D mesh models of each part are "assembled" and in a step f) the solid model of the complex part is obtained. This solid model facilitates the analysis of the assembled part taking into account that the stacking rules have to be met for the set simple parts as a whole and not just for each one of them separately enabling their design to be quicker and more robust.

The method can be implemented by means of software additional to the CAD tool used (e.g. CATIA) that includes specific code for the automation of those stages of the method not covered by the CAD tool used and for providing the interfaces with the CAD tool in those stages that need it.

Those modifications that are included within the scope of the following claims can be introduced into the developed preferred embodiment.

The invention claimed is:

1. A method of designing a bent part of composite material using a computer assisted CAD system, which method comprises the following stages
   a) Supplying the 2D mesh model of a laminate used to form a part, which model comprises a pattern of contour lines;
   b) Generating the 3D outer surface of a tool on which a flat laminate is to be bent to form a bent part;
   c) Obtaining the 3D mesh model by adapting the 2D mesh model to the geometry of the 3D outer surface of said tool;
   d) Generating the solid model of the bent part wherein step c) is effected by bending the contour lines of the patterns of the 2D model with respect to bending lines set up in relation to a bending surface of a similar shape to that of the tool provided for forming the part during its manufacture.

2. The method of designing a bent part of composite material according to claim 1, wherein the said tool is a male tool and the 3D outer surface corresponds with shape of the outer layer of the part.

3. The method of designing a bent part of composite material according to claim 1, wherein the said tool is a female tool and the 3D outer surface corresponds with the shape of the female tool.

4. The method of designing a bent part of composite material according to claim 1, wherein the said bent part is a simple part of an aeronautical structure.

5. The method of designing a bent part of composite material according to claim 4, wherein the said simple part is a C-shaped spar.

6. The method of designing a bent part of composite material according to claim 1, wherein the said bent part is a complex part resulting from the assembly of two or more simple parts and in that the method includes the application of stages a), b) and c) to each simple part, a stage e) in which the 3D mesh models of each part are assembled and a stage f) in which a solid model of the complex part is obtained.

7. A data medium storing program instructions which when it is executed on a computer together with a CAD system or included in it, causes the execution of the method forming the subject of claim 1.

\* \* \* \* \*